No. 617,595. Patented Jan. 10, 1899.
J. J. MUNDORFF.
SPECTACLE ATTACHMENT FOR EYEGLASSES.
(Application filed Apr. 8, 1898.)
(No Model.)

WITNESSES:
INVENTOR
J. J. Mundorff
BY
ATTORNEYS.

UNITED STATES PATENT OFFICE.

JOHN J. MUNDORFF, OF NEW YORK, N. Y.

SPECTACLE ATTACHMENT FOR EYEGLASSES.

SPECIFICATION forming part of Letters Patent No. 617,595, dated January 10, 1899.

Application filed April 8, 1898. Serial No. 676,859. (No model.)

*To all whom it may concern:*

Be it known that I, JOHN J. MUNDORFF, of the city of New York, borough of Manhattan, in the county of New York and State of New York, have invented a new and Improved Spectacle Attachment for Eyeglasses, of which the following is a full, clear, and exact description.

My invention relates to an improvement in devices adapted to be attached to eyeglasses, so as to temporarily convert them into spectacles, and thus render them less liable to fall off when the wearer is exercising or doing any kind of work liable to displace the ordinary eyeglasses.

The invention consists of the novel features of construction, which will be hereinafter described and claimed.

Reference is to be had to the accompanying drawings, forming a part of this specification, in which similar characters of reference indicate corresponding parts in all the views.

Figure 1:
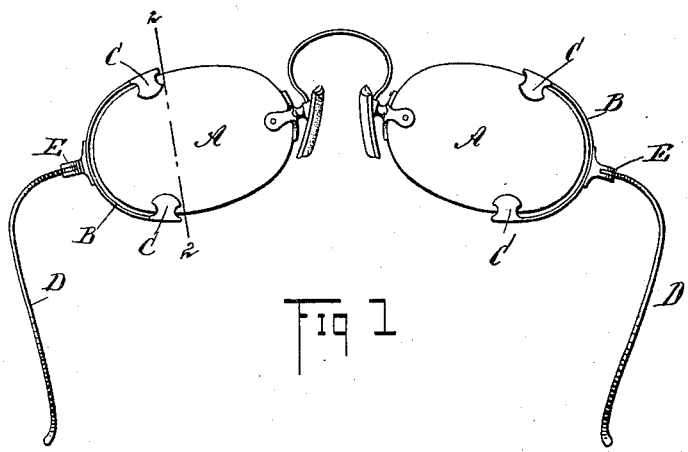
Figure 2:
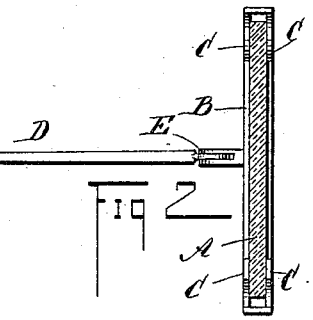
Figure 3:
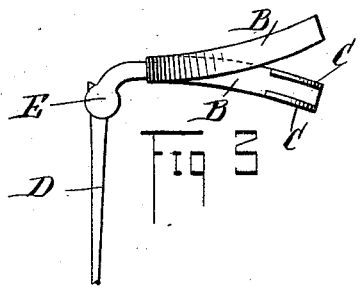

Figure 1 is a front elevation of the device applied to a pair of eyeglasses. Fig. 2 is a section taken upon the line 2 2 of Fig. 1, and Fig. 3 is a side view of that portion of the attachment which is directly connected to the glasses.

It is often found by people who have to wear eyeglasses and who occasionally engage in games or exercise of a nature requiring quick movements that the eyeglasses are very liable to become displaced, and thus to cause considerable trouble. For convenience in such uses I have designed the attachment which will be hereinafter described, which may be temporarily attached to any pair of eyeglasses and will for the time convert them into a pair of spectacles. This will enable the wearer to have the greater safety and convenience afforded by spectacles over eyeglasses and yet enable him to secure at other times the better appearance of eyeglasses.

My invention consists of a spectacle-bow D, which is hinged at E by a hinge similar to that used at the corresponding point in spectacles to a curved spring-bar B. This spring-bar is of such length and shape as to fit about the edge of the outer portion of the lens A. At each end it is provided with two ears or jaws C, which project toward the center and so as to embrace the edges of the lens. The spring-bars B are given a side bend, as is clearly shown in Fig. 3. The object of this is to throw the jaws C out of line with each other, so that when they are placed upon the lens they will clamp against the lens, and thus be held securely in place. The same result might be obtained by giving the spring-bars B a twist; but the construction shown in Fig. 3 is preferred. This throws both of the spring-bars into tension, and thus secures a tighter grasp upon the lens. It also enables the device to be applied to an ordinary lens without any special preparation. It will also tightly grasp lenses of different thicknesses.

This device may be readily applied to or removed from the eyeglasses and when in use will convert them into spectacles, so that there will be small danger of their being removed by any ordinary exercise. When not wanted, these attachments may be removed and placed in the pocket. They can be applied in a moment.

Having thus described my invention, I claim as new and desire to secure by Letters Patent—

1. The combination of eyeglasses with spring-arms extending along opposite edges of the lens and having jaws attached to their ends adapted to embrace the edges of the lens, the spring-arms being bent to one side, each in opposite directions so as to throw the jaws normally out of line with each other, substantially as described.

2. The combination of eyeglasses, with spring-arms adapted to embrace the outer edges of the lenses and having jaws attached to their ends adapted to embrace the edges of the lenses, said jaws upon opposite arms being normally held at an angle with each other and the lenses so as to occupy different planes, and spectacle-bows attached to said spring-arms, substantially as described.

3. As an article of manufacture, an attachment for eyeglasses, comprising a curved clamping-bow having two slightly-separated jaws at each end extending toward those upon the other end and normally spring-held at an angle with each other and the central plane of the bow, and a spectacle-bow attached to the clamping-bow, substantially as described.

JOHN J. MUNDORFF.

Witnesses:
WM. E. TRAYESER,
JOSEPH KLEIN.